United States Patent
McElroy et al.

(10) Patent No.: US 7,739,730 B1
(45) Date of Patent: *Jun. 15, 2010

(54) MECHANISM FOR AUTOMATICALLY CONFIGURING INTEGRATED ACCESS DEVICE FOR USE IN VOICE OVER DIGITAL SUBSCRIBER LINE CIRCUIT

(75) Inventors: Paul Graves McElroy, Huntsville, AL (US); Joseph Russell McFarland, Madison, AL (US); Jonathan Aaron Wright, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/496,688

(22) Filed: Jul. 31, 2006

Related U.S. Application Data

(63) Continuation of application No. 09/934,746, filed on Aug. 22, 2001, now Pat. No. 7,093,289.

(51) Int. Cl.
*G06F 9/00* (2006.01)
*G06F 17/00* (2006.01)
(52) U.S. Cl. .................. 726/13; 709/220; 370/254
(58) Field of Classification Search .................. 726/13; 709/220; 370/254
See application file for complete search history.

(56) References Cited

U.S. PATENT DOCUMENTS

| | | | |
|---|---|---|---|
| 5,572,515 A | 11/1996 | Williamson et al. ............ 370/17 |
| 5,594,727 A * | 1/1997 | Kolbenson et al. ........... 370/442 |
| 5,704,304 A * | 1/1998 | Burton et al. ........... 112/470.31 |
| 5,889,470 A | 3/1999 | Kaycee et al. ......... 340/825.07 |
| 5,991,270 A | 11/1999 | Zwan et al. .................. 370/249 |
| 6,012,088 A * | 1/2000 | Li et al. ...................... 709/219 |
| 6,061,392 A | 5/2000 | Bremer et al. ............... 375/222 |
| 6,084,881 A | 7/2000 | Fosmark et al. ............. 370/397 |
| 6,091,713 A | 7/2000 | Lechleider et al. .......... 370/248 |
| 6,098,028 A | 8/2000 | Zwan et al. .................. 702/120 |
| 6,335,927 B1 * | 1/2002 | Elliott et al. ................. 370/352 |
| 6,704,304 B1 | 3/2004 | Gallagher et al. ........... 370/352 |

* cited by examiner

*Primary Examiner*—Kambiz Zand
*Assistant Examiner*—William S Powers
(74) *Attorney, Agent, or Firm*—Allen, Dyer, Doppelt, Milbrath & Gilchrist, P.A.

(57) ABSTRACT

An integrated access device is automatically configured to conduct packetized voice and data communications between a customer's voice/data equipment and a digital communications switch. For this purpose, the IAD's communication control processor is programmed to perform an automated analysis of the digital communications link and thereby identify communication interface circuits such as DSLAM and voice gateway units, that have been installed by the service provider. It then automatically configures the communication parameters of the IAD for communication compatibility with the communication interface circuits.

25 Claims, 3 Drawing Sheets

MECHANISM FOR AUTOMATICALLY CONFIGURING INTEGRATED ACCESS DEVICE FOR USE IN VOICE OVER DIGITAL SUBSCRIBER LINE CIRCUIT

CROSS-REFERENCE TO RELATED APPLICATION

The present application is a continuation application of U.S. patent application Ser. No. 09/934,746 filed on Aug. 22, 2001 now U.S. Pat. No. 7,093,289, entitled "Mechanism For Automatically Configuring Integrated Access Device For Use In Voice Over Digital Subscriber Line Circuit", assigned to the assignee of the present application, and the disclosure of which is incorporated herein.

FIELD OF THE INVENTION

The present invention relates in general to communication systems, and is particularly directed to a digital communication link pre-establishment control mechanism, that is incorporated into the control software employed by the microcontroller of a customer premises-installed integrated access device (IAD), through which packetized voice and data services are supplied to a customer site, and which is operative to automatically set the operational parameters of the IAD to conform with those of various pieces of equipment employed by a service provider to deliver the packetized voice and data services.

BACKGROUND OF THE INVENTION

Digital subscriber loop (DSL)-based (packetized) communications currently enable telecommunication service providers to deliver multiple types of digital signalling channels (e.g., voice and data) at a fraction of the cost of conventional time division multiplexed (TDM)-based circuit switched networks. To deliver packetized voice and data, the service provider may deploy several different pieces of communication interface equipment (such as asynchronous transfer mode (ATM) switches, digital subscriber line access multiplexers (DSLAMs) and voice gateways in the signal transport path from a central office to a customer premises-resident IAD.

Since the IAD is customer-purchased and installed, the service provider does not participate in the customer's choice of what is connected to the DSL line. However, in order for the customer to be able to conduct (packetized) voice over digital subscriber line (vodsl) communications through its IAD, it is necessary that the IAD's supervisory communications controller be properly initialized or preconfigured with a prescribed set of communication parameters that make the IAD compatible with the DSLAM and voice gateway equipment, that may be sourced from a variety of vendors, each having their own proprietary methods for handling various layer services, set-up and management.

Now although this and other parameter information of the subscription service are provided by the service provider to the purchaser of the terminal equipment, the customer is usually technically unsophisticated and accustomed to doing nothing more than performing a 'plug-and-play' exercise. Indeed, experience has revealed that a very large majority of DSL customers will burden the equipment supplier and/or the service provider with requests for technical support in the course of configuring the IAD, irrespective of whether the service provider has correctly supplied each of the parameters to the customer.

SUMMARY OF THE INVENTION

In accordance with the present invention, the user's (actual or perceived) inability to properly configure an IAD, even when provided with correctly assigned operational parameters by the service provider, is successfully remedied by an automated IAD configuration mechanism, that is resident in the control software employed by the communications controller of the customer premises-installed IAD. As will be described, this automated IAD mechanism is operative to perform an analysis of the digital communications link to which the IAD is connected, and thereby identify communication interface equipment, such as DSLAM and voice gateway units, employed by the service provider. It then automatically configures communication parameters of the IAD for communication compatibility with the identified (DSLAM and voice gateway) devices.

The automated link analysis mechanism initially performs a first automated communication property analysis of the communications link to determine the digital transport encoding format, such as high level data link control (HDLC) protocol, asynchronous transfer mode (ATM) protocol, or customized ATM protocol. This initial analysis includes determining line rate, and digital transport encoding format in accordance with information representative of the line rate. Then, using information representative of the digital transport encoding format, it performs a second automated communication property analysis to identify a communication interface device such as a DSLAM. Once the DSLAM is identified, a communication property analysis of the communications link is performed to identify the voice gateway, and its voice transport protocol. Also, parameters associated with the voice gateway are determined, such as virtual circuit address, number of voice ports, and port signaling.

DETAILED DESCRIPTION

Figure 1:
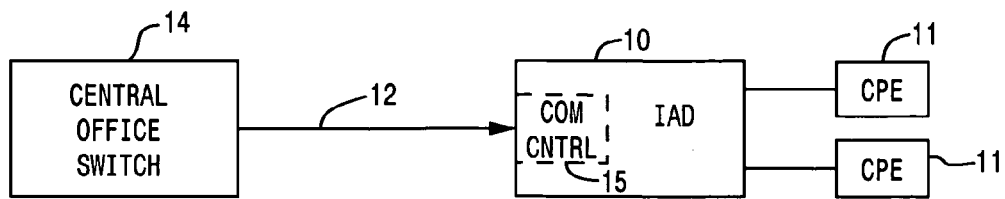
FIG. 1 diagrammatically illustrates a reduced complexity example of a digital telecommunication network, having a link coupled from a telephone company (telco) central office to customer premises equipment containing the present invention.

Before describing in detail the automated IAD configuration mechanism in accordance with the present invention, it should be observed that the invention resides primarily in what is effectively a prescribed DSL communication link pre-establishment control mechanism, that is embedded in the communications control software resident in the packet communications controller of an integrated access device. Consequently, the invention has been illustrated in the drawings in block diagram and associated flow chart format, which show only those specific details that are pertinent to the present invention, so as not to obscure the disclosure with details which will be readily apparent to those skilled in the art having the benefit of the description herein. Thus, the block diagram and flow chart illustrations are primarily intended to illustrate the major components of the IAD configuration mechanism of the invention in a convenient functional grouping, whereby the present invention may be more readily understood.

FIG. 1 is a reduced complexity diagrammatically illustration of the interconnection of customer premises installed DSL connectivity device, here an integrated access device (IAD) 10, serving multiple customer premises equipments (CPEs) 11, via a digital communication link 12 (such as a T1 link, as a non-limiting example) to a central office 14 of a communication service provider, through which access to a public switched telephone network (PSTN) packet data network is provided. As a non-limiting example, the IAD 10 may comprise an Total Access 608 IAD, manufactured by Adtran Corp., Huntsville, Ala. It should be observed, however, that the invention is not limited to use with this or any other particular type of integrated access device, but is intended as an augmentation to the communication supervisory control mechanisms employed in IADs supplied from a variety of communication equipment manufacturers.

As pointed out briefly above, various configuration parameters required for successful operation of the integrated access device are usually supplied by the service provider. However, being technically inexperienced, the customer may have difficulty in setting up such configuration parameters and can be expected to call the equipment supplier and/or the local telephone service provider, with a request for assistance as to how to configure the IAD.

In accordance with the invention, this problem is successfully obviated by augmenting the control software employed by the IAD's supervisory communications controller 15, to which the DSL link 12 from the central office is coupled, to include an automated IAD configuration mechanism. This automated IAD configuration mechanism is operative to execute a prescribed analysis in the negotiation and configuration of the IAD, as shown in the multi-layer sequence of the flow chart of FIG. 2. Based upon this analysis, the invention is able to automatically configure (set the operational parameters of) the customer's IAD to conform with those of communication interface devices (voice gateway and DSLAM equipments) employed by the service provider.

Figure 2:
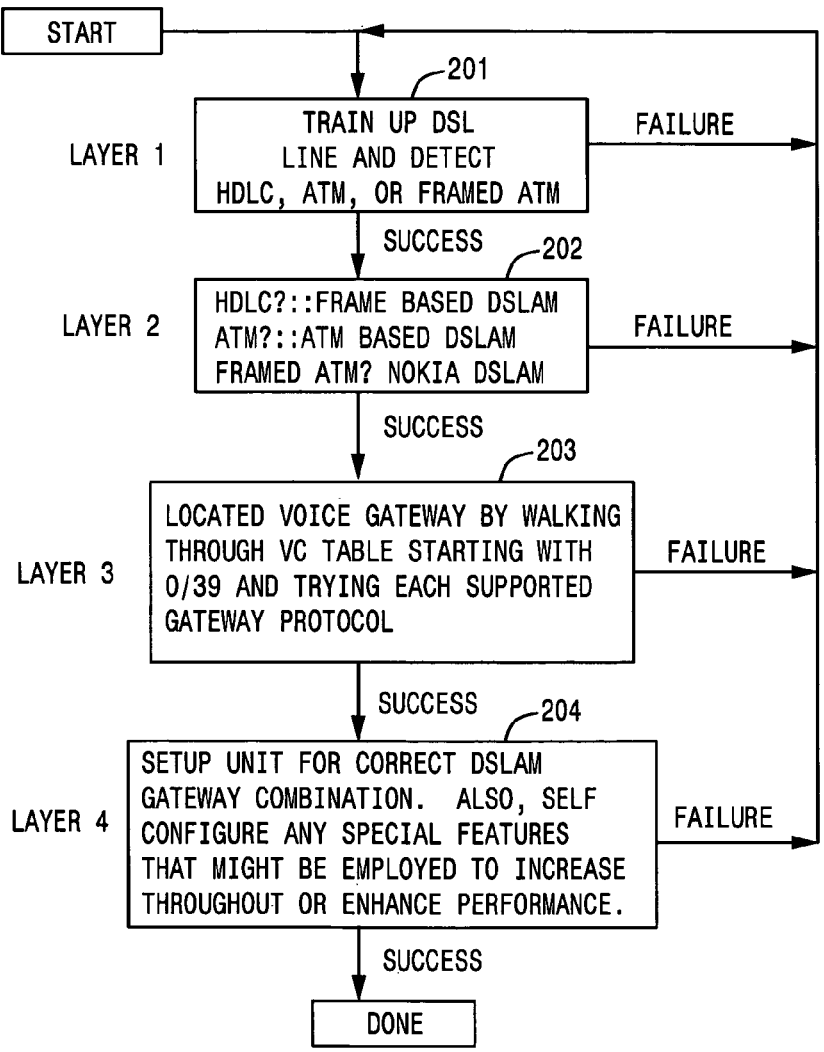
FIG. 2 is a high level flow chart of the automated IAD configuration process of the present invention.

As shown in FIG. 2, the automated IAD configuration process of the present invention is comprised of a sequence of layers: LAYER 1, LAYER 2, LAYER 3, and LAYER 4, the successful completion of each of which is required before moving to the next layer; any failure to resolve a layer reverts the routine to the beginning of the sequence. As will be described with reference to the detailed flow diagram of FIG. 3, layers 1 and 2 are interrelated, such that layer 2 information can be used to assist in identifying layer 1 configuration options.

Layer 1, shown at step 201, serves to train up the DSL link and determine whether the link is using high level data link control (HDLC), ATM, or a customized (framed) ATM transport protocol. Layer 1 identification is subject to vendor-specific implementations of the layer 1 interface controller and configuration of those options by the remote device.

In order to provide an instructive, but non-limiting example, the following description of conducting a layer 1 determination will assume that an SDSL interface of the type available from Conexant Systems, Inc., Newport Beach, Calif., is employed. This choice of SDSL interface is based upon the fact that Conexant equipment includes configuration options that can be changed by IAD and DSLAM designers to effect how data is encoded/decoded. If the options are configured differently, data will not be decoded into the same format from which it was encoded.

These and additional settings are detected and matched to the far end device's configuration. Moreover, an SDSL interface from Conexant is multi-rate capable. As different propriety schemes may be used to negotiate the desired line rate, the line rate operational mode is determined and matched to the line rate of the far end device. These and additional settings are detected and matched to the configuration of the far end device.

Figure 3:
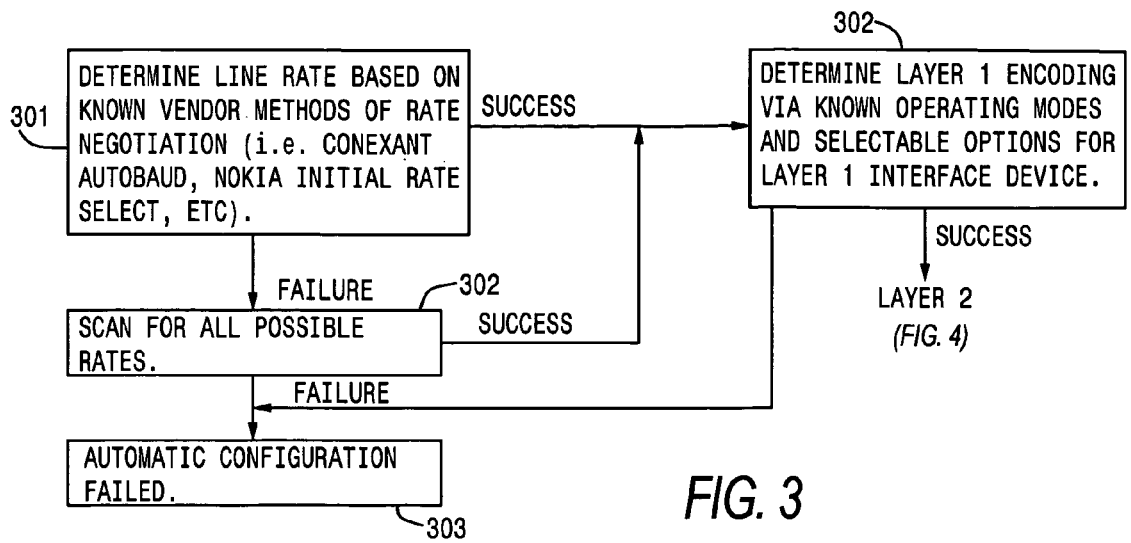
FIG. 3 is a flow chart of a layer 1 subroutine employed within the automated IAD configuration process of FIG. 2.

For this purpose, as shown in the layer 1 subroutine diagram of FIG. 3, at step 301, the line rate is determined. As pointed out above, determining the line rate is based upon a priori rate negotiation information available from equipment vendors (e.g., Conexant Autobaud, Nokia initial rate select, etc.). In step 301, such line rate negotiation information, as stored in a table, is sequentially examined. If the line rate is identified from an available vendor (the result of step 301 is a SUCCESS), the sub-routine transitions to step 304, where layer 1 encoding is determined, as will be described.

However, if an available vendor data fails to enable the line rate to be determined (the result of step 301 is a FAILURE), the routine transitions to step 302, which proceeds to scan all possible line rates. If the line rate is determined in step 302, (the result of step 302 is a SUCCESS), the sub-routine transitions to step 304. If no line rate is found in either of steps 301 or 302 (the result of step 302 is a FAILURE), it is inferred that the line rate cannot be determined, as denoted by the state "Automatic Configuration failed" 303, and the routine reverts back to the start of the auto-configuration sequence of FIG. 2.

To determine layer 1 encoding, step 304 examines a priori known operating modes and selectable options for the layer 1 interface device, as described above. If layer 1 encoding cannot be determined (the result of step 304 is FAILURE), it is inferred that layer 1 cannot be completely determined. The routine therefore transitions to the "Automatic Configuration failed" state 303, and reverts back to the start of the auto-configuration sequence of FIG. 2, as described above. Layer 2, shown at step 202 in the flow chart of FIG. 2, serves to determine which type of DSLAM format is employed, and thus involves the format of the data prior to the layer 1 device encoding and subsequent to layer 1 device decoding.

Figure 4:
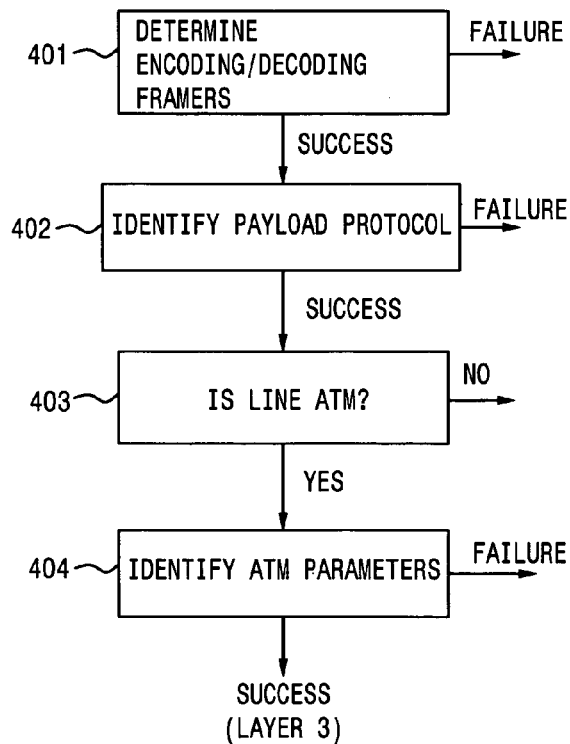
FIG. 4 is a flow chart of a layer 2 subroutine employed within the automated IAD configuration process of FIG. 2.

For this purpose, as shown in the layer 2 subroutine of FIG. 4, the data stream is examined in step 401 for the presence of pre-layer 1 encoding/decoding framers, known a priori from vendor-supplied information stored in memory. The pre-layer 1 encoding/decoding framers provide data stream synchronization. If the framer cannot be determined (the result of step 401 is a FAILURE), the layer 2 subroutine reverts to the start of the auto-configuration sequence of FIG. 2, as described above.

However, if the framer is determined (the result of step 401 is a SUCCESS), the layer 2 subroutine transitions to step 402, to identify the payload specific protocol. Payload protocols provide a variety of operating features, including routing information, control and management information, delivery of end-user data, etc. If the payload specific protocol cannot be determined (the result of step 402 is a FAILURE), the layer 2 subroutine reverts to the start of the auto-configuration sequence of FIG. 2, as described above.

If the payload specific protocol is determined (the result of step 402 is a SUCCESS), the layer 2 subroutine proceeds to query step 403 to determine if the type of line is ATM. If the answer to query step 403 is YES (indicating an ATM line), the subroutine transitions to step 404, which identifies ATM line parameters, data scrambling and idle cell type. Otherwise, the routine reverts to layer 1. To identify whether data scrambling has been enabled or disabled, both modes are attempted, step 404 looks for cell delineation.

Figure 5:
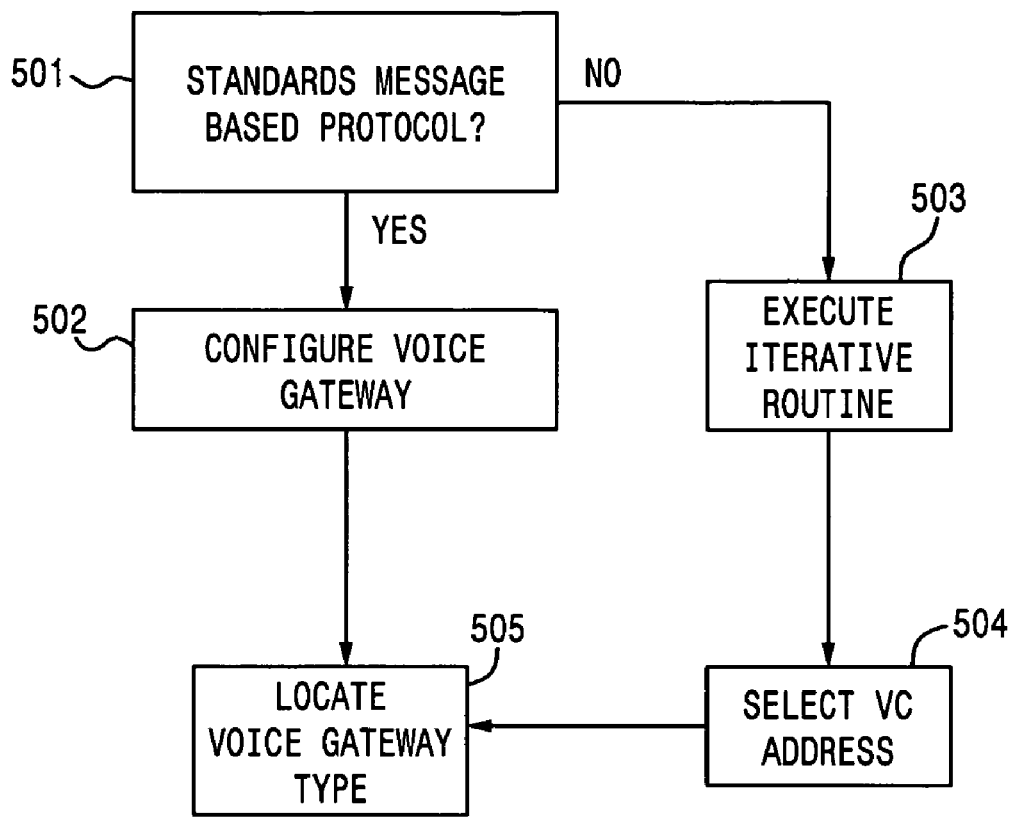
FIG. 5 is a flow chart of a layer 3 subroutine employed within the automated IAD configuration process of FIG. 2.

To determine whether the cell type is idle or unassigned, step 404 may initially assume a given cell type and then observe unknown permanent virtual circuit (PVC) discards. If there is a high rate of unknown PVC discards, it is inferred that the wrong cell type had been initially assumed, and the other cell type is selected. Once layer 2 determination has been successfully completed, the routine transitions to the layer 3 determination, shown at step 203 in the flow chart of FIG. 2, and in the detailed subroutine of FIG. 5.

Layer 3 serves to locate the voice gateway. At an initial query step 501, the subroutine looks for the presence of a standards message based protocol for determining voice gateway and parameters. If the answer to step 501 is YES/SUCCESS, the subroutine transitions to step 502, wherein the detected standards message based protocol is used to configure the voice gateway. Otherwise (the answer to step 501 is NO), an iterative procedure beginning at step 503 is used. It is possible that a detected message based protocol will not detect all necessary parameters. In this event, the located parameters are stored in step 501 and the routine transitions to step 503 of the iterative procedure to detect the remaining parameters.

The information to be determined includes a variety of parameters, such as, but not limited to: virtual circuit address, voice gateway type, number of voice ports, port compression, and port signaling. There are currently available in-band methods for determining a small subset of some these parameters, that are applicable to the particular voice gateway type. In these cases, once the voice gateway type is known, such an in-band method will be initially employed. As an example, a voice gateway provided by Jetstream Corp. has provisions for setting the port signaling parameter for each port of an IAD.

At step 503, the result of the DSLAM detection phase of layer 2 is identified. The virtual circuit (VC) address is selected in step 504, and the signaling state may be used to confirm the virtual circuit address. If Frame Relay has been selected, the VC address is the data link connection identifier (DLCI) 22. If ATM has been detected, the virtual circuit address is selected as VPI:VCI 0:39. The presence of a virtual circuit address (but not whether it supports voice) may be confirmed by using OAM loopback cells.

Once the virtual circuit address has been selected, the routine transitions to step 505, to locate the voice gateway type. In step 505, virtual circuit addresses are individually identified, and the associated voice gate type is then attempted. As a non-limiting example, the sequence of protocols for the voice gateway types may include Jetstream, CopperCom., TollBridge, MGCP, Megaco, LES-CCS (ATM Forum Loop Emulation Service-Common Channel Signaling), and LES-CAS (ATM Forum Loop Emulation Service-Channel Associated Signaling).

Some types of voice gateways, such as Jetstream and LES-CCS, may support multiple voice gateway protocols. In step 505, Jetstream and LES-CCS protocols may be detected by their use of different but specific sub-channel identifiers for call control messages. Most gateway protocols require the initial message to be sent by the IAD; thus, the subroutine may send an initial message and then wait for a specific timeout for a response. For CopperCom and LES-CAS protocols, it is necessary to attempt a temporary call on one port, to determine if a voice gateway is present. More recent versions of the CopperCom gateway support an in-band EOC channel, which can be used instead for detection and configuration.

The number of voice ports can be detected either through the specific in-band management channel, or by transitioning through the range of voice ports attempting a call and looking for a response stream of messages. If there is a failure of any of the steps of voice gateway locate subroutine, the IAD configuration routine fails and reverts to step 201 of FIG. 2.

Once the parameters required of the IAD have been negotiated in layers 1, 2 and 3, the routine transitions to step 204, wherein layer 4 of the supervisory control program executed by the IAD's microcontroller proceeds to configure one or more special features to increase throughput or enhance performance. If the microcontroller is able to complete the configuration of the IAD for the identified DSLAM and gateway parameters, the routine is complete; otherwise, the routine fails and reverts to step 201 of FIG. 2.

As will be appreciated from the foregoing description, the present invention effectively circumvents the inability of a DSL equipment user to properly configure an installed IAD, irrespective of whether or not the customer has been provided with correctly assigned configuration parameters by the service provider. Because it is embedded within the control software employed by the communications controller of the customer premises-installed IAD, the invention is effectively transparent to the user. When the IAD is placed in service, its communications controller first performs the autoconfiguration procedure hereindescribed. Through this procedure, both and voice gateway units employed by the service provider are identified. Thereafter the autoconfiguration routine automatically configures communication parameters of the IAD for communication compatibility with the identified DSLAM and voice gateway units.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method of automatically setting operational parameters of a digital communication device, through which packetized voice and data services are supplied over a digital communication link to a customer site, so that said operational parameters conform with those of various pieces of equipment employed by a service provider to deliver said packetized voice and data services, said method comprising the steps of:

(a) causing said digital communication device to automatically set the line rate for conducting said packetized voice and data communications over said digital communication link;

(b) causing said digital communication device to automatically set the type of encoding to be employed for conducting said packetized voice and data communications over said digital communication link; and (c) causing said digital communication device to automatically set the type of digital communication device communication protocol to be employed for conducting said packetized voice and data communications over said digital communication link, in accordance with the line rate set in step (a) and the type of encoding set in step (b).

2. The method according to claim 1, wherein step (a) comprises causing said digital communication device to automatically set the line rate for conducting said packetized voice and data communications over said digital communication link in accordance with one of stored vendor-supplied a priori negotiation information and a testing of plural line rates.

3. The method according to claim 1, wherein step (b) comprises causing said digital communication device to automatically set the type of encoding to be employed for conducting said packetized voice and data communications over said digital communication link in accordance with an examination of a priori known operating modes and selectable options for said digital communication device.

4. The method according to claim 1, further including the step of:
(d) causing said digital communications device to automatically identify a voice gateway and voice transport protocol.

5. The method according to claim 4, wherein step (d) comprises causing said digital communications device to automatically identify a voice gateway and voice transport protocol in accordance with one of a standards message based protocol and an iterative search through a virtual circuit address table.

6. The method according to claim 1, wherein step (a) comprises causing said digital communication device to automatically set the line rate for conducting said packetized voice and data communications over said digital communication link in accordance with one of stored vendor-supplied a priori negotiation information and a testing of plural line rates, and step (b) comprises causing said digital communication device to automatically set the type of encoding to be employed for conducting said packetized voice and data communications over said digital communication link in accordance with an examination of a priori known operating modes and selectable options for said digital communication device.

7. The method according to claim 6, further including the step of:
(d) causing said digital communications device to automatically identify a voice gateway and voice transport protocol in accordance with one of a standards message based protocol and an iterative search through a virtual circuit address table.

8. The method according to claim 1, wherein step (c) comprises causing said digital communication device to automatically set said type of digital communication device communication protocol based upon a determination of whether said digital communication link is using high level data link control (HDLC), asynchronous transfer mode, or a customized (framed) ATM transport protocol.

9. The method according to claim 8, wherein step (c) further comprises causing said digital communication device to automatically set said type of digital communication device communication protocol by examining a data stream for the presence of encoding/decoding framers known a priori and stored in memory, identifying payload specific protocol, determining whether the type of line is ATM, and identifying ATM line parameters.

10. The method according to claim 1, wherein said digital communication device comprises an integrated access device (IAD).

11. A method of conducting packetized voice and data communications over a digital communication link between a digital communications device at a customer site and digital communication equipment of a service provider, said method comprising the steps of:
(a) automatically setting and conforming operational parameters of said digital communication device with those of said equipment employed by said service provider to deliver said packetized voice and data services by
(a1) causing said digital communication device to automatically set the line rate for conducting said packetized voice and data communications over said digital communication link,
(a2) causing said digital communication device to automatically set the type of encoding to be employed for conducting said packetized voice and data communications over said digital communication link,
(a3) causing said digital communication device to automatically set the type of digital communication device communication protocol to be employed for conducting said packetized voice and data communications over said digital communication link, in accordance with the line rate set in step (a1) and the type of encoding set in step (a2), and
(a4) causing said digital communications device to automatically identify a voice gateway and voice transport protocol; and
(b) conducting packetized voice and data communications over said digital communication link with said equipment of said service provider by way of said digital communications device, operational parameters of which have been automatically set in step (a).

12. The method according to claim 11, wherein
step (a1) comprises causing said digital communication device to automatically set the line rate for conducting said packetized voice and data communications over said digital communication link in accordance with one of stored vendor-supplied a priori negotiation information and a testing of plural line rates,
step (a2) comprises causing said digital communication device to automatically set the type of encoding to be employed for conducting said packetized voice and data communications over said digital communication link in accordance with an examination of a priori known operating modes and selectable options for said digital communication device, and
step (a4) comprises causing said digital communications device to automatically identify a voice gateway and voice transport protocol in accordance with one of a standards message based protocol and an iterative search through a virtual circuit address table.

13. The method according to claim 12, wherein step (a3) comprises causing said digital communication device to automatically set said type of digital communication device communication protocol based upon a determination of whether said digital communication link is using high level data link control (HDLC), asynchronous transfer mode, or a customized (framed) ATM transport protocol.

14. The method according to claim 13, wherein step (a3) further comprises causing said digital communication device to automatically set said type of digital communication device communication protocol by examining a data stream for the presence of encoding/decoding framers known a priori and stored in memory, identifying payload specific protocol, determining whether the type of line is ATM, and identifying ATM line parameters.

15. The method according to claim 11, wherein said digital communication device comprises an integrated access device (IAD).

16. In a digital communications device employed at a customer site for conducting packetized voice and data communications over a digital communication link with digital communication equipment of a service provider, a communications control mechanism that is executable by a control processor of said communications device to automatically set and conform operational parameters of said digital communication device with those of said equipment employed by said service provider to deliver said packetized voice and data services, said control mechanism being operative to perform the steps of:

(a) automatically setting the line rate for conducting said packetized voice and data communications over said digital communication link;

(b) automatically setting the type of encoding to be employed for conducting said packetized voice and data communications over said digital communication link; and (c) automatically setting the type of digital communication device communication protocol to be employed for conducting said packetized voice and data communications over said digital communication link, in accordance with the line rate set in step (a) and the type of encoding set in step (b).

17. The communications control mechanism according to claim 16, wherein step (a) comprises automatically setting the line rate for conducting said packetized voice and data communications over said digital communication link in accordance with one of stored vendor-supplied a priori negotiation information and a testing of plural line rates.

18. The communications control mechanism according to claim 16, wherein step (b) comprises automatically setting the type of encoding to be employed for conducting said packetized voice and data communications over said digital communication link in accordance with an examination of a priori known operating modes and selectable options for said digital communication device.

19. The communications control mechanism according to claim 16, wherein said control mechanism is operative to perform the further step of:

(d) automatically identifying a voice gateway and voice transport protocol.

20. The communications control mechanism according to claim 19, wherein step (d) comprises automatically identifying a voice gateway and voice transport protocol in accordance with one of a standards message based protocol and an iterative search through a virtual circuit address table.

21. The communications control mechanism according to claim 16, wherein step (a) comprises automatically setting the line rate for conducting said packetized voice and data communications over said digital communication link in accordance with one of stored vendor-supplied a priori negotiation information and a testing of plural line rates, and step (b) comprises automatically setting the type of encoding to be employed for conducting said packetized voice and data communications over said digital communication link in accordance with an examination of a priori known operating modes and selectable options for said digital communication device.

22. The communications control mechanism according to claim 21, wherein said control mechanism is operative to perform the further step of:

(d) automatically identifying a voice gateway and voice transport protocol in accordance with one of a standards message based protocol and an iterative search through a virtual circuit address table.

23. The communications control mechanism according to claim 16, wherein step (c) comprises automatically setting said type of digital communication device communication protocol based upon a determination of whether said digital communication link is using high level data link control (HDLC), asynchronous transfer mode, or a customized (framed) ATM transport protocol.

24. The communications control mechanism according to claim 23, wherein step (c) further comprises automatically setting said type of digital communication device communication protocol by examining a data stream for the presence of encoding/decoding framers known a priori and stored in memory, identifying payload specific protocol, determining whether the type of line is ATM, and identifying ATM line parameters.

25. The communications control mechanism according to claim 16, wherein said digital communication device comprises an integrated access device (IAD).

* * * * *

UNITED STATES PATENT AND TRADEMARK OFFICE
CERTIFICATE OF CORRECTION

PATENT NO. : 7,739,730 B1
APPLICATION NO. : 11/496688
DATED : June 15, 2010
INVENTOR(S) : McElroy et al.

It is certified that error appears in the above-identified patent and that said Letters Patent is hereby corrected as shown below:

| | |
|---|---|
| Column 3, Line 6 | Delete: "diagrammatically" <br> Insert: --diagrammatical-- |
| Column 3, Line 15 | Delete: "an" <br> Insert: --a-- |
| Column 3, Line 17 | Delete: "both" <br> Insert: --both DSLAM-- |
| Column 5, Line 30 | Delete: "some these" <br> Insert: --some of these-- |

Signed and Sealed this
Eighteenth Day of January, 2011

David J. Kappos
*Director of the United States Patent and Trademark Office*